(No Model.)  2 Sheets—Sheet 1.
R. LUNDELL.
GOVERNING ELECTRIC MOTORS.
No. 486,213.  Patented Nov. 15, 1892.
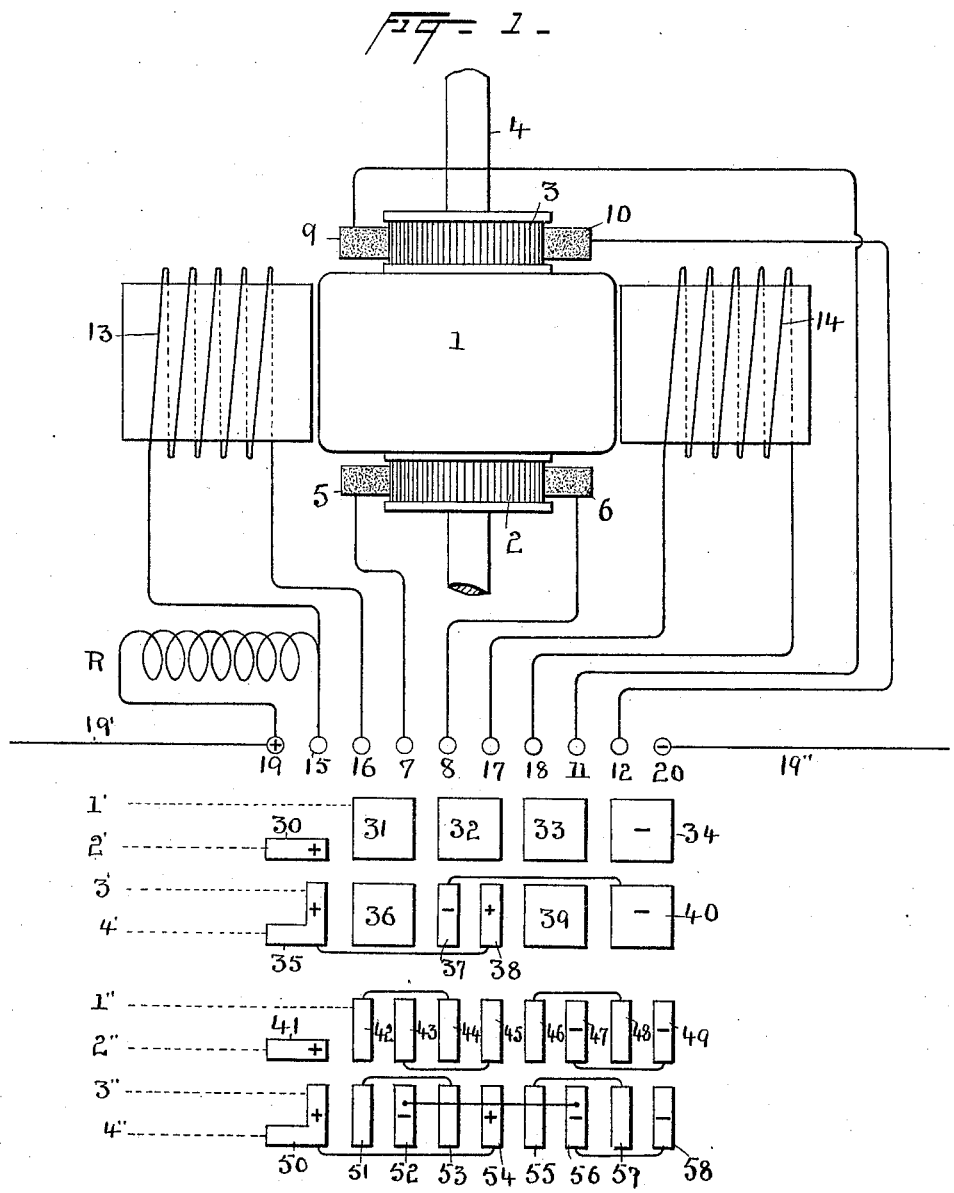
Witnesses
Norris S. Clark.
N. F. Oberly
Inventor
R. Lundell.
By his Attorneys
Dyer & Suly.

(No Model.) 2 Sheets—Sheet 2.
R. LUNDELL.
GOVERNING ELECTRIC MOTORS.
No. 486,213. Patented Nov. 15, 1892.
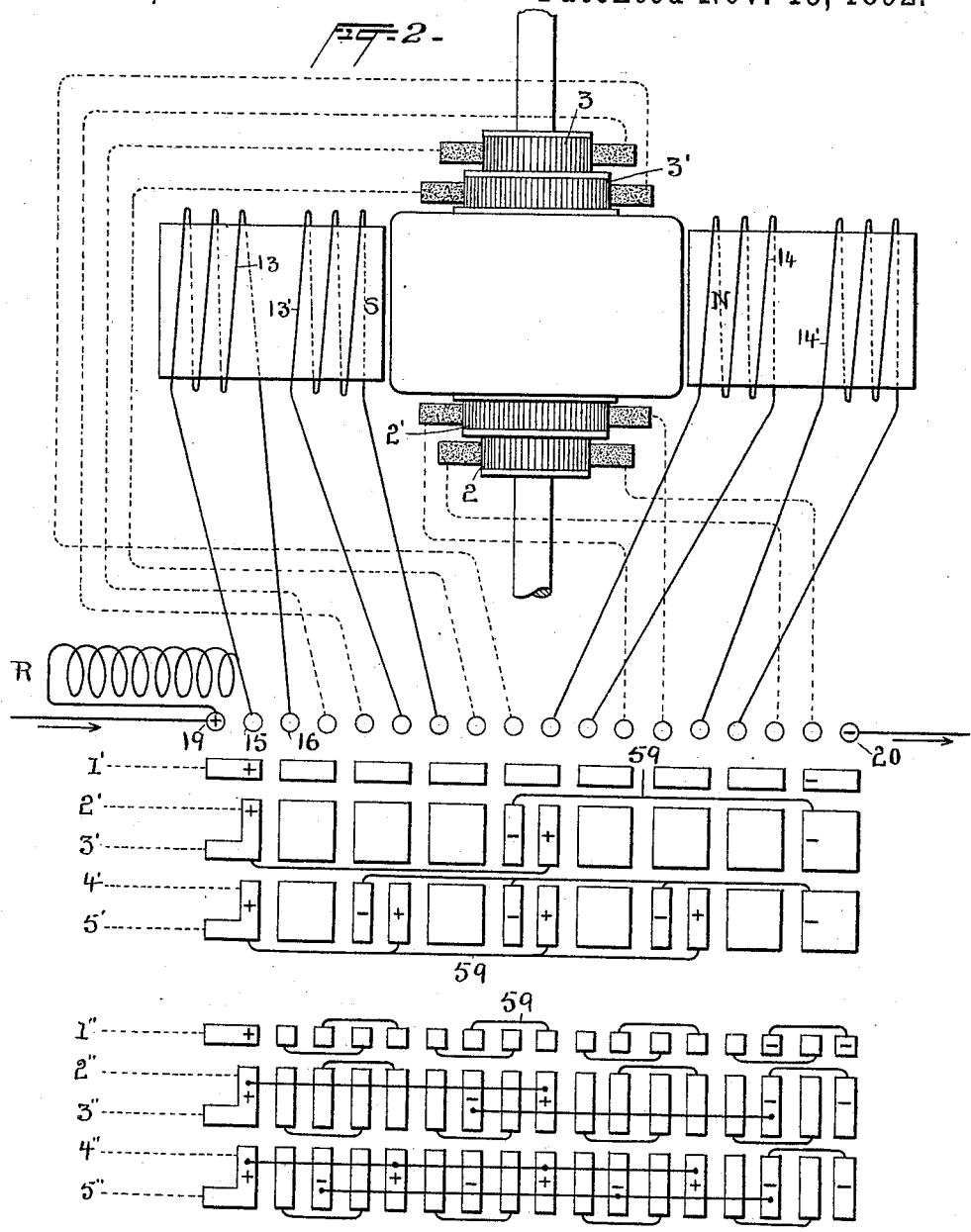

UNITED STATES PATENT OFFICE.

ROBERT LUNDELL, OF NEW YORK, N. Y., ASSIGNOR OF ONE-HALF TO EDWARD H. JOHNSON, OF SAME PLACE.

GOVERNING ELECTRIC MOTORS.

SPECIFICATION forming part of Letters Patent No. 486,213, dated November 15, 1892.

Application filed December 19, 1891. Serial No. 415,573. (No model.)

*To all whom it may concern:*

Be it known that I, ROBERT LUNDELL, a citizen of the United States, residing at New York city, in the county and State of New York, have invented a certain new and useful Improvement in Governing Electric Motors, of which the following is a specification.

The object of the present invention is to provide a simple method and means for governing the speed of an electric motor and at the same time keeping the torque thereof constant at the several speeds. Most of the motors now in use have only a small range of speed and cannot be run at the lowest speed without danger of burning out or without sacrificing efficiency, while by my improvement both of these objections are obviated. I am aware of the fact that several methods of governing motors have been devised by which the speed can be varied from a few revolutions per minute up to full speed with safety; but in these cases the methods or the apparatus are so elaborate that they are not considered practical for ordinary commercial purposes, such as governing the speed of street-car motors, in which case it is very desirable to have a wide range of speed, such as is readily obtained with an ordinary steam-locomotive. With such locomotive it is possible to obtain a maximum torque while at rest and to vary the speed from nothing to full speed while keeping the torque practically constant, although it will be slightly diminished at the highest speeds and the torque will depend upon the train resistance. The ideal speed regulation of a steam-locomotive is made the basis of the present improvement, which is illustrated in the drawings, in which—

Figures 1 and 2 are diagrams showing two forms of motor and controlling switches embodying my improvements, and which are hereinafter described in detail.

In carrying my invention into effect I provide the dynamo-electric machine used as an electric motor with two or more independent coils or sections of coils upon its armature, and also two or more independent coils or sections of coils upon its field-magnet. This construction enables me to alter both the relation to each other in which the armature-sections are connected and also the relation to each other in which the field-magnet sections are connected, and by doing this I change the speed by the change in the armature connections without varying the strength of the field-magnet, and therefore without practically altering the torque. If the armature alone were wound sectionally with its coils in series with the field-magnet coils, the change of the armature-sections from series to multiple arc with each other would affect the strength of the field-magnet and so change the torque, and, on the other hand, if the field-magnet alone is sectional a change in the relation of its coils produces a comparatively slight variation in speed; but by altering both the speed is changed by the variation of the armature-coils, while the field-magnet remains constant. I prefer to connect each section of the armature winding in series with a section of the field-magnet winding, and the motor therefore is wound with two or more circuits, each circuit comprising, in series, a section of the armature and a section of the field-magnet. I provide suitable switching mechanism by which the relation of these circuits to each other is varied from series to parallel or multiple-arc relation, such switching mechanism being preferably constructed so that the direction of rotation of the armature may be reversed thereby. To provide for intermediate variations of current, I may, if necessary, provide, also, a resistance which at certain positions of the switch is introduced in the circuit of the motor and at other positions is removed from the circuit.

In Fig. 1 is shown a series-wound motor, the armature 1 of which has two commutators 2 3 on shaft 4. It will be understood that the armature is wound with two separate wires, preferably having an equal number of turns and the same resistance and symmetrically distributed around the armature-core. One of the armature-coils is connected to the segments of the commutator 2 and the other coil is connected to the segments of commutator 3; but for the sake of simplicity these wires are not shown in the drawings. Bearing on commutator 2 are two brushes 5 6, connected, respectively, to the circles 7 8, which represent switch-brushes, springs, or similar contact devices. Bearing on commutator 3 are two brushes 9 10, connected, respectively, to similar brushes 11 12. The field-magnet has two coils 13 14, the terminals of the former being connected, respectively, to the brushes 15 16 and the terminals of the latter being connected to the brushes 17 18. 19 20 are switch-brushes or contact devices, to which the incoming line 19', which is supplied with a practically-constant potential, and the outgoing line 19'' are connected, 19 being connected to 15 through the artificial resistance R. The switch-plates or segments for changing the circuit connections are shown below the brushes 7 8, &c., those of the upper section being numbered consecutively from 30 to 40 and those of the lower section being numbered consecutively from 41 to 58. In practice said plates are preferably mounted on the surface of an insulating-cylinder forming the body of a snap-switch, and the brushes 7 8, &c., will stand between the two sections of plates when the circuit is open, so that the motor can be made to move forward by turning the switch in one direction from its normal position and in the opposite direction by turning said switch oppositely; but the contact-plates should be so arranged that they will move in relation to the brushes in the direction indicated by the arrows at the left of the figure. The parts are not shown in the exact relation above indicated, since it would require crossing and consequent confusion of many of the lines. With the circuit-connections and switch, as shown in this figure, four different speeds can be given to the motor in one direction by placing the switch successively, so that the brushes will stand in the lines 1' 2' 3' 4', and four speeds can be given in the opposite direction by moving the switch so that the brushes will stand successively in the lines 1'' 2'' 3'' 4''. Two of these changes of speed are due entirely to a change in the connection of the several coils, said changes being so made that the strength of the field-magnet is not materially altered. The other two changes are due to throwing the resistance R into or out of circuit in connection with the commutation of the coils. Suppose the switch to be moved to position 1', in which case the circuit would be from brush 19, through resistance R, to coil 13, brush 16, plate 31, commutator-brush 5, armature-coil, to brush 6, to brush 8, plate 32, brush 17, field-magnet coil 14, brush 18, plate 33, brush 11, commutator-brush 9, through the second armature-coil in the same direction as through the first coil, to commutator-brush 10, to brush 12, plate 34, and to the terminal of the outgoing line. Thus all the field-magnet and armature-coils and the artificial resistance are in series and the field-magnet and armature-coils alternate, so that they will come into circuit properly as succeeding changes in their connections are made. This movement of the switch starts the motor slowly. By moving the switch to position 2' resistance R is cut out of circuit and the speed of the motor thereby increased to, say, one-half the full speed for which the motor is constructed to run and with full torque. By moving the switch to position 3' one field-magnet coil and one armature-coil in series are thrown into multiple arc with the other like coils, R being in the motor-circuit, and the speed will be further increased; but the strength of the field-magnet will not be changed by the change in coil connections, since while the current through the field-magnet coils is increased by the reduction of resistance, owing to the fact that the field-magnet and armature coils are now in multiple series instead of in series, the number of ampère-turns in the field-magnet coils remain the same, because while we have doubled the current only one-half of it is sent through each field-magnet coil. Of course as the regulation is effected in part by throwing the resistance R into or out of circuit to enable us to get additional speed regulations without multiplying the number of armature-coils the strength of the field-magnet will be varied by the change in current on the line, due to the cutting in or out of said resistance. It will be clear that if only two speeds are needed the resistance may be entirely omitted; but it is desirable to get intermediate speeds. The resistance also prevents undue current at the moment of starting. The operation will be similar to that above set forth when the lower section of the switch is utilized; but, as already indicated, this will drive the motor in the opposite direction. It is to be noticed that in the arrangement above described there is never any idle wire (that is, there are never idle coils) in the motor and that each winding will always carry its proper amount of current without danger of being burned out. To more fully explain this method of regulation, let it be assumed that the motor, wound as shown in Fig. 1, is a twenty-four-kilo Watt machine wound for five hundred volts and is running at full speed—say three hundred revolutions per minute—the switch being in the position 4', the resistance of the motor-circuit when one field-magnet and one armature-winding are in series and the two field-magnet and armature branches are in multiple being one ohm and the extra resistance R being 2.7 ohms. Consequently in the fourth position of the switch we have a current of forty-eight ampères and a counter electro-motive force of four hundred and fifty-two volts, since $\frac{500-e}{1}=48$. As assumed, this gives three hundred revolutions. Moving the switch to the third position, we have a current as before, forty-eight ampères, and a counter electro-motive force of three hundred and twenty-two volts, since $\frac{500-e}{1+2.7}=48$, and the speed will be approximately $\frac{300}{1}\times\frac{322}{452}=213$ revolutions per minute. Moving the switch to the second position, we have a current of twenty-four ampères, a resistance of four ohms, and a counter electro-motive force of four hundred and four volts, since $\frac{500-e}{4}=24$, and the speed will be approximately $\frac{300}{2}\times\frac{404}{452}=134$ revolutions per minute, and finally, with the switch in the first position, we have a current of twenty-four ampères, a resistance of 6.7 ohms, and a counter electro-motive force of three hundred and thirty-nine volts, since $\frac{500-e}{6.7}=24$, and the speed will be approximately $\frac{300}{2}\times\frac{339}{452}=112$ revolutions per minute.

In Fig. 2 a series motor is shown having four field-magnet coils 13 13' 14 14' and four commutators 2 2' 3 3', it being understood that each commutator is connected to a separate armature-coil, as above explained, the several coils of the field-magnet and the several commutator-brushes being connected to the switch-brushes or contact devices 15 16, &c., in the order shown. The incoming line is connected to brush 19 through R to 15, and the outgoing line is connected to 20. In connection with this form of motor the switch is slightly different from that above described. It has five different positions on each side of the open position, as indicated by the numerals 1' to 5' and 1" to 5". In this switch some of the contact-plates are connected by conductors, as indicated at 59. This is for the purpose of enabling the switch to correctly change the order of arrangement of the several coils. It will be unnecessary to describe the circuits in detail; but by tracing them out on the drawings it will be found that when the switch is in position 1' all the field-magnets and armature coils will be in series and the resistance R will be out of circuit, and that the coils of the field-magnet and armature alternate in the series, so that the coils will come properly into circuit when the connection is changed by the switch shown to series, multiple, or multiple series; but this particular order of coils is not essential. In the second position of the switch there will be a multiple-series connection, there being two field-magnet and two armature-coils in each branch and the resistance R being in the circuit. In the third position of the switch the connection will be the same, except that resistance R will be cut out. When the switch is in the fourth position, all the field-magnet coils will be in parallel and there will be one armature-coil in series with each field-magnet coil, and resistance R will be in circuit, while by the following movement of the switch resistance R will be cut out. This gives the highest speed for which the motor is constructed, at the same time maintaining the torque at its highest point. When the lower section of the switch is used, the motor will be reversely driven, as heretofore described. This is a more perfect form than that of Fig. 1, owing to the larger number of coils giving a larger number of different speeds by commutating the coils without the resistance R.

I do not limit my invention to a switch mechanism having just the arrangement of contact-plates, &c., shown in the drawings, nor to any particular type of motor, since these are details which can be largely varied.

What I claim is—

1. An electric motor having its armature and field-magnet each wound with independent sections of coils, in combination with circuit-changing devices for varying the series and multiple-arc relation of the armature-coils, and circuit-changing devices for varying the series and multiple-arc relation of the field-magnet coils, substantially as set forth.

2. An electric motor having two or more circuits, each of which circuits includes in series a section of coils on the armature and a section of coils on the field-magnet, in combination with circuit-changing devices for varying the series and multiple-arc relation of said circuits, substantially as set forth.

3. An electric motor having two or more independent sections of coils on its armature, each connected to a separate commutator, a section of coils on the field-magnet connected in series with each of said armature-sections, and circuit-changing devices for varying the series and multiple-arc relation of the armature and field-sections, substantially as set forth.

4. The combination, with an electric motor having its armature and its field-magnet each wound with independent sections of coils, of circuit-changing devices connected therewith for simultaneously changing the series and multiple-arc arrangement of the armature-sections and the series and multiple-arc arrangement of the field-magnet coil-sections, substantially as set forth.

5. The method of regulating the speed of an electric motor, which consists in varying both the series and multiple-arc relation of its armature-coils and the series and multiple-arc relation of its field-magnet coils, substantially as set forth.

6. An electric motor having its armature and field-magnet each wound with independent sections of coils, in combination with a resistance in the motor-circuit, circuit-changing devices for varying the series and multiple-arc relation of the armature-coils, circuit-changing devices for varying the series and multiple-arc relation of the field-magnet coils, and circuit-changing devices for cutting said resistance in and out of circuit, substantially as set forth.

7. The combination of a field-magnet having several independent coils, an armature having an equal number of coils, a commutator for each armature-coil, and a switch mechanism having contact-plates co-operating with switch-brushes to close the circuit through all the coils in series when in one position and to close the circuit through the coils in multiple arc when in another position, substantially as set forth.

8. The combination of a field-magnet having several independent coils, an armature having an equal number of coils, a commutator for each armature-coil, an artificial resistance connected or adapted to be connected to the line-terminals and to a field-terminal, and a switch mechanism having contact-plates co-operating with switch-brushes to close the circuit through all the coils in series when in one position and to close the circuit through the coils in multiple arc when in another position, said switch having, also, contacts co-operating with the terminals to which said resistance is connected and arranged to throw the resistance in circuit when the switch is in certain positions and out of circuit when the switch is in other positions, substantially as set forth.

This specification signed and witnessed this 10th day of December, 1891.

ROBERT LUNDELL.

Witnesses:
CHARLES M. CATLIN,
EUGENE CONRAN.